Dec. 8, 1931.  A. BRIECHLE  1,835,457
CAMERA MAGAZINE
Filed June 6, 1930  3 Sheets-Sheet 2

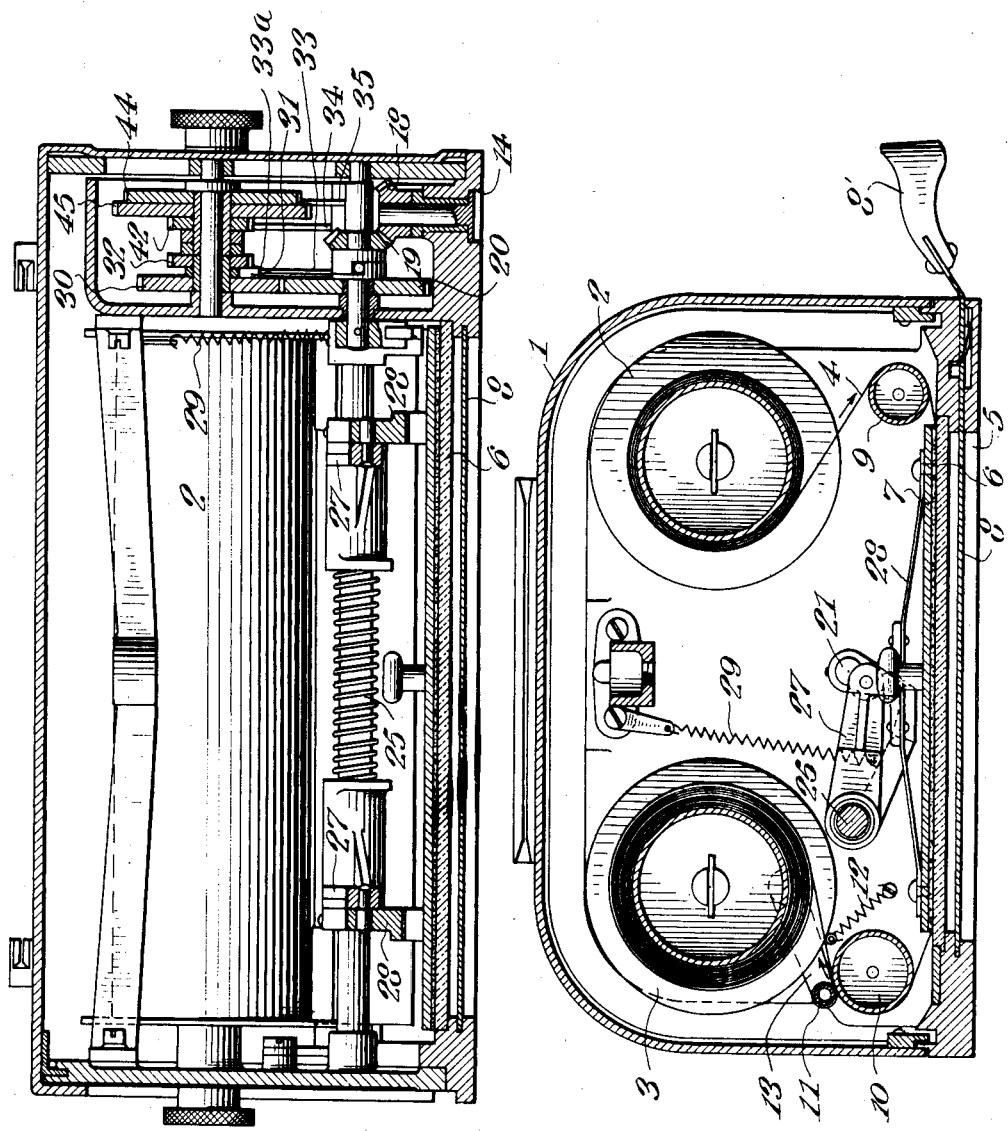

INVENTOR
Ambrosius Briechle
BY
ATTORNEYS

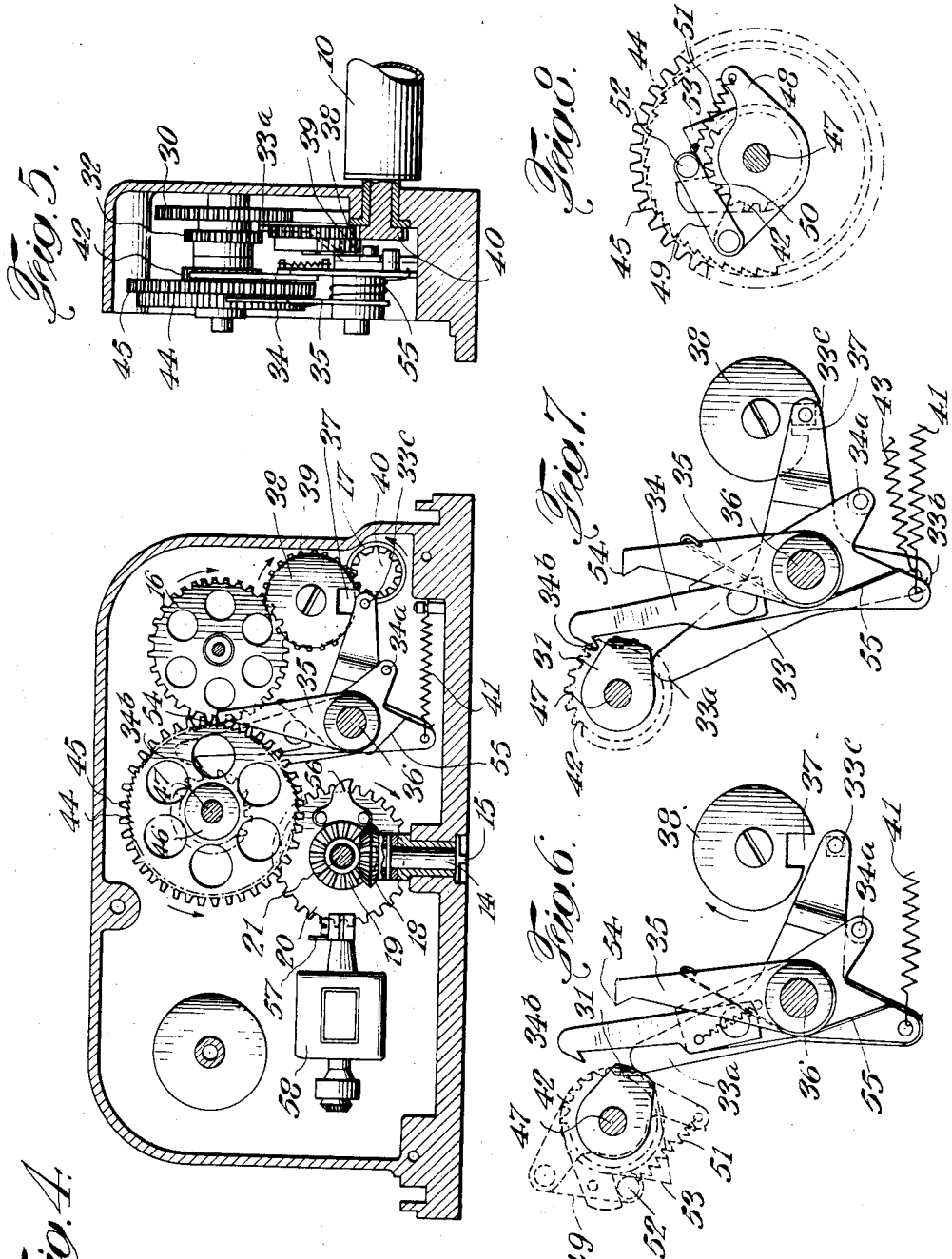

Patented Dec. 8, 1931

1,835,457

UNITED STATES PATENT OFFICE

AMBROSIUS BRIECHLE, OF NEW YORK, N. Y., ASSIGNOR TO FAIRCHILD AERIAL CAMERA CORPORATION, OF NEW YORK, N. Y., A CORPORATION OF NEW YORK

CAMERA MAGAZINE

Application filed June 6, 1930. Serial No. 459,521.

This invention relates in general to photographic cameras and more particularly to improvements in magazines for aerial cameras.

An object of this invention is to provide means whereby the film may be positively fed and the interval of feeding may be positively regulated, and the film be positively pressed flat at the proper interval before exposure and released from such pressure after exposure.

Another object is to provide a mechanism for accomplishing this result by means of a simple but efficient mechanism, the parts of which will be so inner-related that they are inter-dependent in their relationship and positive in their operation.

With the foregoing and other objects in view, the invention consists in the combination of parts and in the details of construction hereinafter set forth in the following specification and appended claims, certain embodiments being illustrated in the drawings, in which:

Figure 1 is a transverse section through the magazine showing the film rolls in elevation.

Figure 2 is a longitudinal section through the magazine showing the take-up film roll in side elevation and the operating mechanism in longitudinal section.

Figure 4 is a view in end elevation of the operating mechanism with the camera magazine cover removed.

Figure 5 is a longitudinal section through the operating mechanism.

Figure 6 is an enlarged detailed view of the operating levers showing their relative position with an operating cam when the levers are released from their locking engagement with the measuring roll.

Figure 7 is a similar view showing the operating levers in locked engagement with the measuring roll.

Figure 8 is a detailed view of the camera operating pawl for effecting and releasing the drive of the film roll by the operating mechanism.

Figure 3:
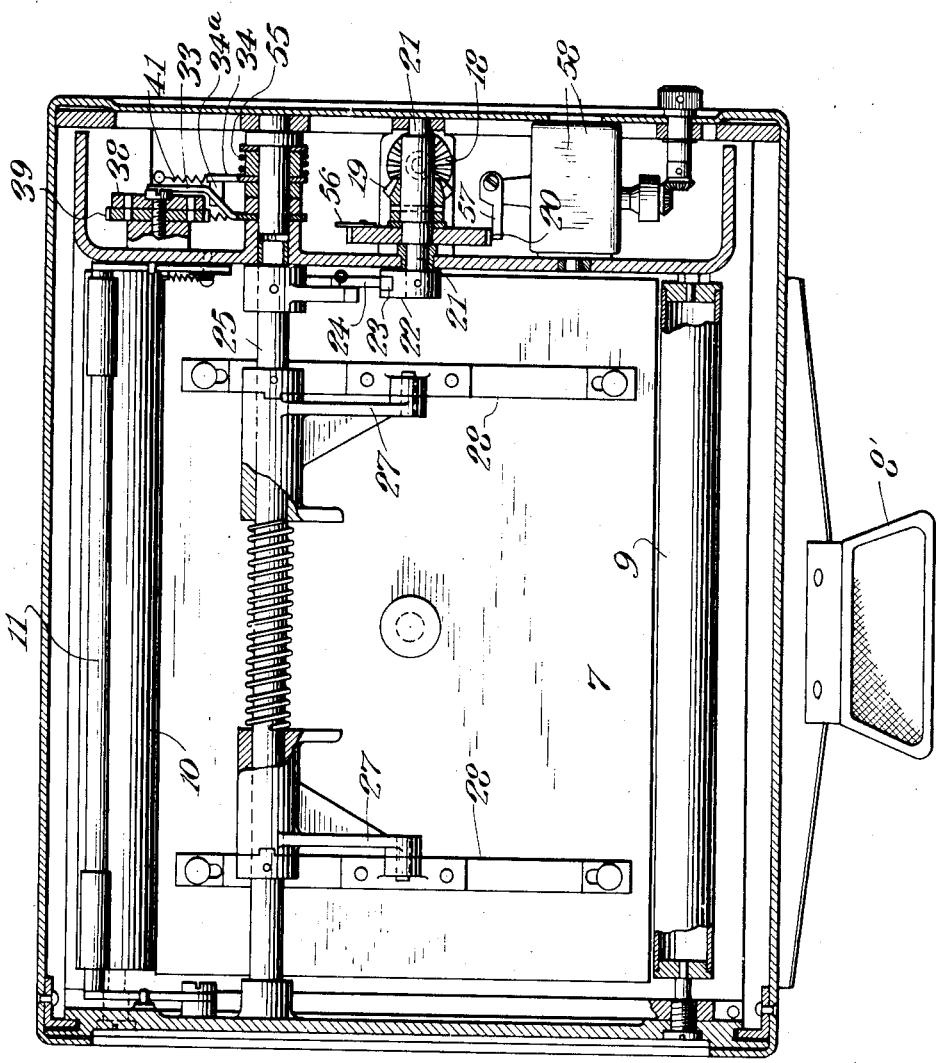
Figure 3 is a plan view of the pressure-plate with the camera magazine cover removed, showing the operating mechanism in horizontal section.

Referring more particularly to the drawings, there are arranged, within the casing 1, a film roll 2 and a take-up roll 3, the film being represented at 4 and arrows showing the direction of movement of the film in the normal operation of the camera. The bottom of the magazine is formed with a rectangular exposure area 5, over which a glass plate 6 is fitted, and a pressure-plate 7 is intermittently resiliently forced against the glass plate or the film therebetween. An opaque slide 8 may be introduced to exclude light from entering the magazine through the exposure area, the plate being provided with an accessible handle 8'.

The film is pulled off of the roll 2 over an idler roll 9, and thence between the plates 6 and 7. The roll 3 is positively rotated by hand or motor driven apparatus and draws the film over a measuring roll 10 and between the latter and a small roll 11 spring-pressed thereagainst by the action of the spring 12 on the lever 13 carrying the freely rotating roll 11.

The magazine as illustrated constitutes a unit of the camera and may be readily releasably attached to the remainder of the camera, motion being imparted to the magazine mechanism through a shaft 14 provided with a projection 15 which may be received in a keyway in the driving shaft of the camera body. This latter construction is not shown but is common in the well-known Fairchild aerial camera, one type of which is adequately shown in the patent to Fairchild No. 1,612,860 of January 4, 1927.

The film take-up roll 3 is releasably connected to the ring gear 16 so as to be driven thereby, while the measuring roll 10 is operatively connected to the ring gear 17. An operation by hand or by motor to wind the film results in a rotation of the shaft 14. A bevel gear 18 carried thereby meshes with a bevel gear 19 carried by a shaft 21 which also carries a ring gear 20, causing the latter to be rotated in a clockwise direction.

A rotation of the shaft 21 results in an operation of the film pressure-plate. This is brought about by a movement of an eccentric 22 carried by the shaft 21, the eccentric being provided with a roller 23 which presses down on an arm 24 carried by the shaft 25 which is freely rotatably mounted in the magazine casing, a spring 29 being provided to resist the rotation of the shaft 25. Spaced arms 27 are also carried by the shaft 25 to exert a downward pressure on the pressure-plate through the medium of the leaf springs 28 connected to the arms 27 and the pressure-plate.

Simultaneously with the above described action of the pressure-plate, the gear 20 meshing with a ring gear 30 rotates the latter which carries a cam 31 and a ring gear 32. Operating levers 33, 34 and 35 are all loosely mounted on a pin 36 secured in the casing. The enlarged portion of the cam 31 upon rotation engages with the arm 33ª of the lever 33 causing the lever to rotate and lug 33ᶜ carried thereby to be withdrawn from a recess 37 in the end of the shaft 38. Prior to this removal the shaft 38 was locked against rotation. The measuring roll shaft 17 is provided with a ring gear 40 which meshes with the ring gear 39 carried by the shaft 38. Thus the removal of the lug 33ᶜ from the recess 37 leaves the two shafts 17 and 38 free to rotate. This allows film to be drawn around the measuring roll 10 between the latter and the pressure roll 11, and to continue uninterruptedly for one revolution of the shaft 38 when the lug 33ᶜ is forced into the recess 37 by the spring 41.

The lever 33, in its movement caused by the cam 31, contacts with the lug 34ª of the lever 34 causing its pawl 34ᵇ to become disengaged from the ratchet 42. This pawl 34ᵇ is normally held in engagement with the gear 42 by the action of the spring 43, allowing the gear 30 and 32 and the cam to be rotated without any driving action resulting from such rotation.

The purpose of the ring gear 45 is to rotate the gear 16 to effect the winding of the film. During the operation of the pressure plate the measuring roll is locked against rotation and the rotation of the shaft 14 is not transmitted to the gear 45 or the film take-up roll gear 16. The ratchet 44 and gear 45 are journalled on a bearing 46 which is rotatably mounted on the pin 47. Also journalled on this bearing is a plate 48 on which there is pivotally mounted a pawl 49 with a single tooth 50 having a tendency to be forced by the spring 51 into engagement with the ratchet 32. A counter-clockwise rotation of the gear 30 while the pawl 34ᵇ engages the loosely mounted ratchet 42 causes the lug 52 of the pawl 49 to ride up on the cam 53, which is integral with the ratchet 42, thus disengaging the pawl tooth 50 from the ratchet 32. When, however, the pawl 34ᵇ is disengaged from the ratchet 42, the spring 51 forces the tooth 50 of the pawl 49 into engagement with the ratchet 32, so that a clockwise rotation of the gear 20 in turning the gear 30 in a counter-clockwise direction effects a corresponding rotation of the gear 45 which rotates as a unit with the gear 30 during the period of disengagement of the pawl 34ᵇ with the ratchet 42.

The positive action of the cam 31 against arm 33ª of the lever 33 resulting in the described result of releasing the pawl 34ᵇ from the ratchet 42 and the lug 33ᶜ from the recess 37 continues long enough for the shaft 38 to be rotated sufficiently to bring the recess 37 out of alignment with the lug 33ᶜ. Consequently it is necessary that the shaft 38 shall make one complete revolution before the lug may again be forced into the recess by the springs 41 and 43.

In the meantime the gear 45 being driven and the gear 16 being driven thereby, film is wound on the take-up roll causing a rotation of the measuring roll and pressure roll. The measuring roll gear 40 and the regulating gear 39 and assembly thus being rotated, allows the take-up roll to be wound only during the rotation of the shaft 38, the rotation of the latter being heretofore described. The function of the lever 35 is to keep the pawl 54 in engagement with the ratchet 44 by means of the spring 55 to prevent a clockwise rotation of the ratchet 44 and the gear 45, thus avoiding the possibility of a counter-clockwise rotation of the gear 16 resulting in a reverse winding of the film.

A suitable counter 58, the construction of which does not form any part of the present invention, there being many well-known types of counters in existence, is provided in the camera magazine and is fitted with an actuating lever 57 adapted to be operated upon each complete revolution of the gear 20 by means of a lug 56 secured to this gear plate. The function of the gear 20 has such a relation, as hereinbefore described, to the remaining operating parts of the magazine assembly that the actuation of the lever 57 via the lug 56 does not occur until the completion of a photographic exposure has been accomplished, the counter thus being able to register a true indication of the number of photographs which are taken during the operation of the camera.

Having thus described my invention, I claim:

1. In a film camera, a driving mechanism, a film feeding mechanism including a feed roll adapted to be driven by said driving mechanism and including a measuring roll over which a winding roll is adapted to draw said film, means controlled by said driving mechanism for intermittently locking said measuring roll against rotation and for releasing such locked engagement, locking and releasing means for said measuring roll operated by said driving mechanism, and locking and releasing means for said feed roll operated by said measuring roll, and a pressure plate actuated by said driving mechanism for intermittently positively pressing said film flat over the exposure area of said camera.

2. In a film camera, a film feeding mechanism including a film feed roll and a measuring roll over which said film is drawn by said feed roll, driving mechanism for said feed roll and a driving connection therebetween, said measuring roll being free from any driving connection with said driving mechanism, locking and releasing means for said measuring roll operated by said driving mechanism, and locking and releasing mechanism for said feed roll operated by said measuring roll for the purpose of controlling the angular movements of said feed roll through an intermittently effected driving connection between said driving mechanism and said feed roll controlled by said measuring roll.

3. In a film camera, a film feeding mechanism including a film feed roll and a measuring roll over which said film is drawn by said feed roll, a film pressure plate and a counter mechanism and a driving mechanism for positively intermittently operating the same, said feed roll being driven by said driving mechanism and said measuring roll being free from any driving connection therewith, means controlled by the angular movements of said measuring roll for correspondingly controlling the angular movements of said feed roll, locking and releasing means for said measuring roll operated by said driving mechanism, and locking and releasing means for said feed roll operated by said measuring roll for the purpose of operation of said feed roll, measuring roll, pressure plate, and counter being accomplished in predetermined sequence and extent.

4. In a film camera, a film feeding mechanism including a driving mechanism, a film feed roll driven thereby, and a measuring roll over which said film is drawn, said measuring roll being otherwise free from any driving connection with said film feeding mechanism, a recessed shaft driven by said measuring roll, a lever engaging said recess to lock said measuring roll against rotation, a cam carried by said driving mechanism for intermittently releasing such locked engagement for permitting said measuring roll to complete a revolution, locking and releasing means for said measuring roll operated by said driving mechanism, and locking and releasing means for said feed roll operated by said measuring roll for the purpose of effecting a driving connection between said driving mechanism and said feed roll when said measuring roll is unlocked and for discontinuing said driving connection when said measuring roll is in locked position.

5. In a film camera, a film feeding mechanism including a film feed roll and a measuring roll over which said film is drawn by said feed roll, said measuring roll being otherwise free from any driving connection with said film feeding mechanism, said driving mechanism comprising an intermittently operated gear for driving said feed roll, a driving connection between said feed roll and said driving mechanism and means controlled by the rotation of said measuring roll for alternately effecting the engagement and disengagement of said driving connection, coacting elements between said driving mechanism and said measuring roll for locking the latter against rotation and for periodically releasing said locked engagement.

6. In a film camera, a film feeding mechanism including a driving mechanism, a film feed roll driven thereby, and a measuring roll over which said film is drawn, said measuring roll being otherwise free from any driving connection with said film feeding mechanism, a recessed shaft operated by said measuring roll said driving mechanism comprising driving elements and periodically engaged driven elements, a lever engaging the recess in said shaft to lock said measuring roll against rotation, a cam carried by the driving elements of said driving mechanism for intermittently releasing such locked engagement for permitting said measuring roll to complete a revolution, operated by said first lever for controlling a cam and a ratchet carried by said feed roll, a pawl adapted to engage said ratchet, a second lever operated by said first lever for controlling said cam actuated pawl and ratchet for bringing about the engagement of the driving and driven elements of said driving mechanism with said feed roll substantially simultaneously with the unlocking of said measuring roll.

7. In a film camera, a film feeding mechanism including a driving mechanism, a film feed roll driven thereby, and a measuring roll over which said film is drawn, said measuring roll being otherwise free from any driving connection with said film feeding mechanism, a recessed shaft operated by said measuring roll, said driving mechanism comprising driving elements and periodically engaged driven elements, a lever engaging the recess in said shaft to lock said measuring roll against rotation, a cam carried by the driving elements of said driving mechanism for intermittently releasing such locked engagement for permitting said measuring roll to complete a revolution, operated by said first lever for controlling a cam and a ratchet carried by said feed roll, a pawl adapted to engage said ratchet, a second lever operated by said first lever for controlling said cam actuated pawl and ratchet for bringing about the engagement of the driving and driven elements of said driving mechanism with said feed roll substantially simultaneously with the unlocking of said measuring roll, a pressure plate for positively intermittently pressing the film over the exposure area of said camera, and a counter both being positively driven by said driving elements of said driving mechanism, the operation of said feed roll, measuring roll, pressure plate, a counter being accomplished in predetermined sequence and extent.

In testimony whereof, I have signed my name to this specification this 27 day of May, 1930.

AMBROSIUS BRIECHLE.